United States Patent

Herndon

[15] 3,692,934
[45] Sept. 19, 1972

[54] ROLL AND PITCH SIMULATOR UTILIZING 360° DISPLAY

[72] Inventor: John W. Herndon, Orlando, Fla.

[73] Assignee: The United States of America as represented by the Secretary of the Navy

[22] Filed: Feb. 11, 1971

[21] Appl. No.: 114,433

[52] U.S. Cl.............178/7.5 D, 178/7.85, 178/7.88, 178/DIG. 35, 315/18, 350/29
[51] Int. Cl............................H04n 5/68, H04n 5/74
[58] Field of Search.....315/18; 178/7.5 SE, DIG. 20, 178/DIG. 35, 7.3 D, 7.5 D, 6.5, 6.8, 7.85, 7.88

[56] References Cited

UNITED STATES PATENTS

| | | | |
|---|---|---|---|
| 3,432,219 | 3/1969 | Shenker et al. | 178/7.88 X |
| 3,458,651 | 7/1969 | Dryden | 178/7.3 D X |
| 3,011,063 | 11/1961 | Deutschle | 315/18 X |
| 3,221,099 | 11/1965 | Breitbord | 178/7.5 SE |

*Primary Examiner*—Robert L. Richardson
*Attorney*—Richard S. Sciascia and John W. Pease

[57] ABSTRACT

In a training device having a television system for projecting a scene such as, for example, an outdoor view, the scene may be viewed by a trainee from a simulated craft which experiences roll, pitch and other movements. The scene is optically projected onto a display screen from an image on the face of a cathode ray tube. The invention provides electronic means for moving the image on the cathode ray tube to move the projected scene on the display screen and thus simulate roll and pitch movements of the simulated craft.

1 Claim, 4 Drawing Figures

PATENTED SEP 19 1972

INVENTOR
John W. Herndon
BY *John F. Miller*
AGENT

INVENTOR
John W. Herndon
BY John F. Miller
AGENT

ROLL AND PITCH SIMULATOR UTILIZING 360° DISPLAY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention is in the field of training devices, particularly those training devices which utilize a television system for projecting a scene to be observed by a trainee.

In the prior art numerous training devices have been built which embody a position from which a trainee can manipulate controls and observe a response in a projected scene. Typically the trainee is stationed in a mockup of a boat, airplane, or vehicle. When he manipulates controls such as a wheel, stick, or throttle, the observed scene responds in a manner which simulates various movements of the training craft.

Heretofore the impression of movement has usually been obtained by moving the craft or the observed scene. This has been done with complex and expensive devices such as servos and hydraulic systems capable of physically moving the considerable mass of the training craft or a large display. The complexity of these systems has resulted in great initial and maintenance expenses and other difficulties.

Applicant has solved these problems of the prior art by providing simple and effective electronic means for simulating motion of a training craft by electronically moving the scene observed by a trainee.

SUMMARY OF THE INVENTION

A cathode ray tube used to generate an image which is projected onto a display screen is so adjusted that the image area of the tube is somewhat smaller than the face or screen of the tube. An adjustable voltage generating means such as a potentiometer is connected to each deflection plate or equivalent in the tube. The deflection voltages can be adjusted to move the image area off-center with respect to the face of the tube, in any selected direction. The movement of the image effects a corresponding movement of the image on the display screen. When used with known training devices this can simulate roll and pitch movements to a trainee observing the display.

DESCRIPTION OF THE PREFERRED EMBODIMENT

Figure 1:
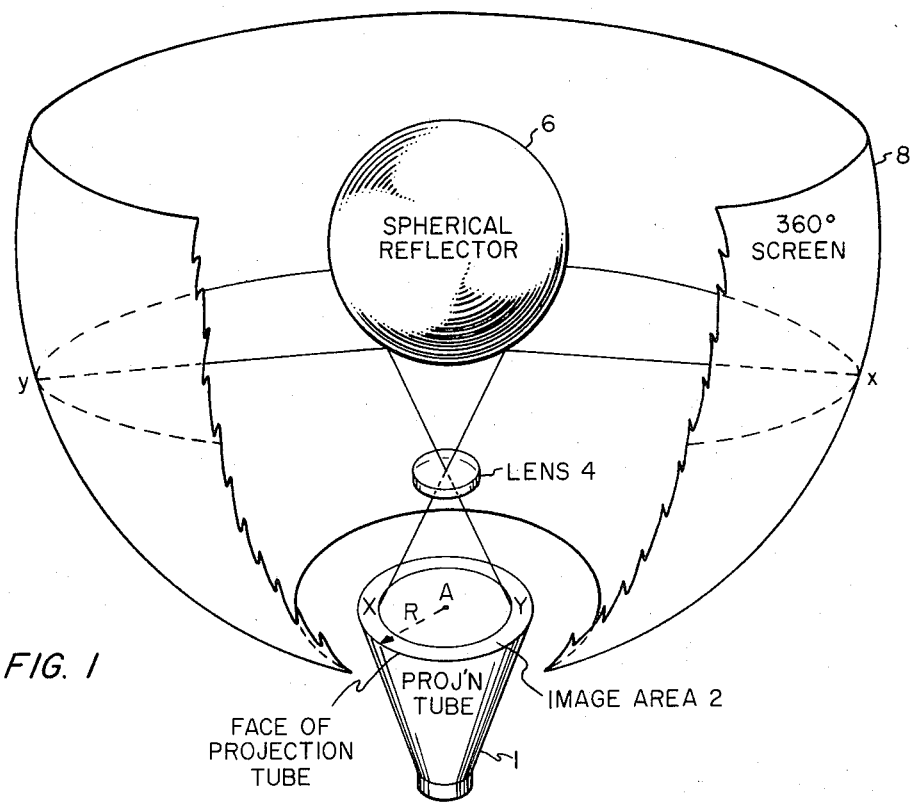
FIG. 1 shows a television projecting arrangement useful in training devices.

FIG. 1 shows one example of a television display which is useful in training devices. Here a cathode ray projection tube 1 is arranged to project an image on an image area 2. Image area 2 is slightly smaller than the screen or face of tube 1. The centers of area 2 and of the screen of 1 coincide at point A. The image on image area 2 is projected through a lens 4 to a spherical reflector 6 and from 6 to a spherical 360° display screen 8. Points X and Y on the image area 2 are projected to points X and Y on screen 8. When the image area 2 is centered on the face of tube 1 as shown, the scene projected on display screen 8 is in a level or normal condition.

Figure 2:
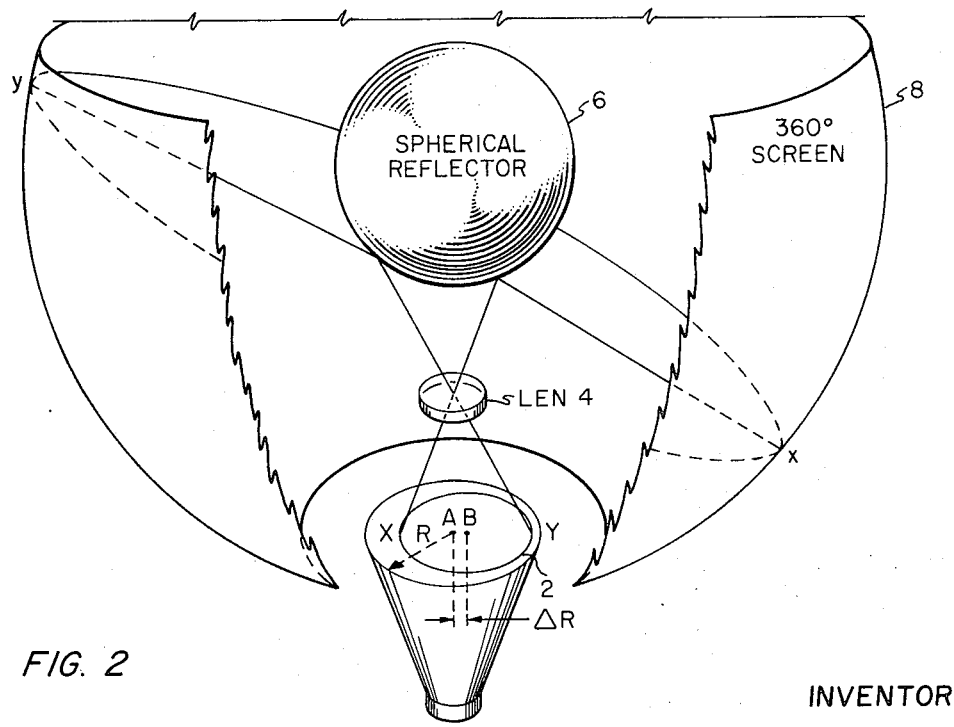
FIG. 2 illustrates the effects of moving an image on the face of the cathode ray projection tube shown in the apparatus of FIG. 1.

FIG. 2 illustrates the operation of applicant's invention. Here the center of image area 2 has been moved a distance $\Delta R$ from point A to point B, where R is the radius of the face of tube 1. Points X and Y on display screen 8 are shifted as shown. The scene displayed on 8 will move downward at the azimuth nearest the image area and upwards at the opposite azimuth, which is farthest from the image area. The scene on 8 can be shifted by an amount and in a direction determined by the amount and direction of movement of image area 2. A trainee positioned in a training craft such as a mockup of an airplane cockpit or boat and observing the scene projected on screen 8 will experience sensations of roll and pitch of magnitudes determined by the movement of image area 2. If lens 4 is removed the movement of the scene shown on screen 8 will be in the opposite direction. A relatively small movement of image area 2 on the face of tube 1 will result in a significant shifting of the scene shown on 8.

Spherical screens and reflectors are illustrated in FIGS. 1 and 2 by way of example only. Other shapes may be employed, as is well known in the art.

Figure 3:
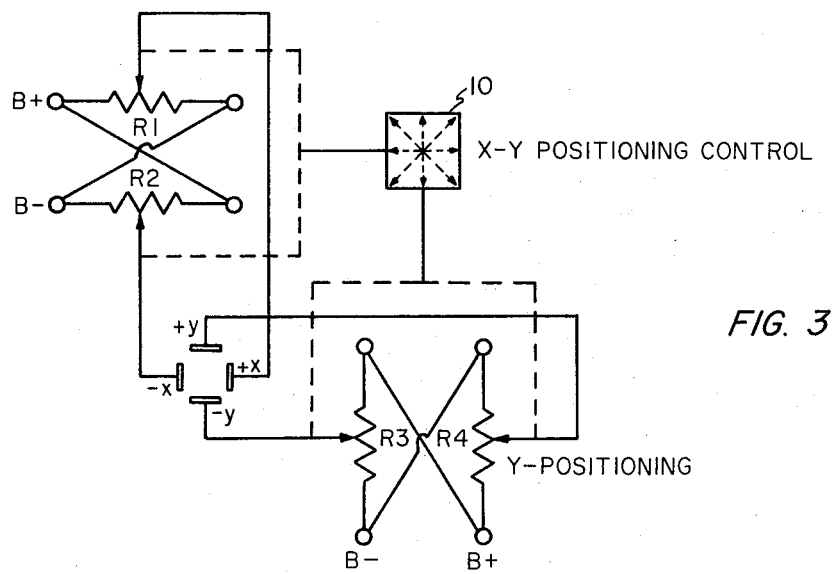
FIG. 3 shows electronic means for effecting the image movement illustrated in FIG. 2.

A preferred embodiment of means for moving image area 2 on the face of tube 1 is shown in FIG. 3. Here four potentiometers R1, R2, R3 and R4 are connected as shown to the deflection plates +X, −X, +Y and −Y of cathode ray tube 1. Voltages on the deflection plates are derived from the potentiometers to position the electron beam of tube 1 and thus position image area 2 in accordance with the adjustment of an X-Y positioning control 10.

Figure 4:
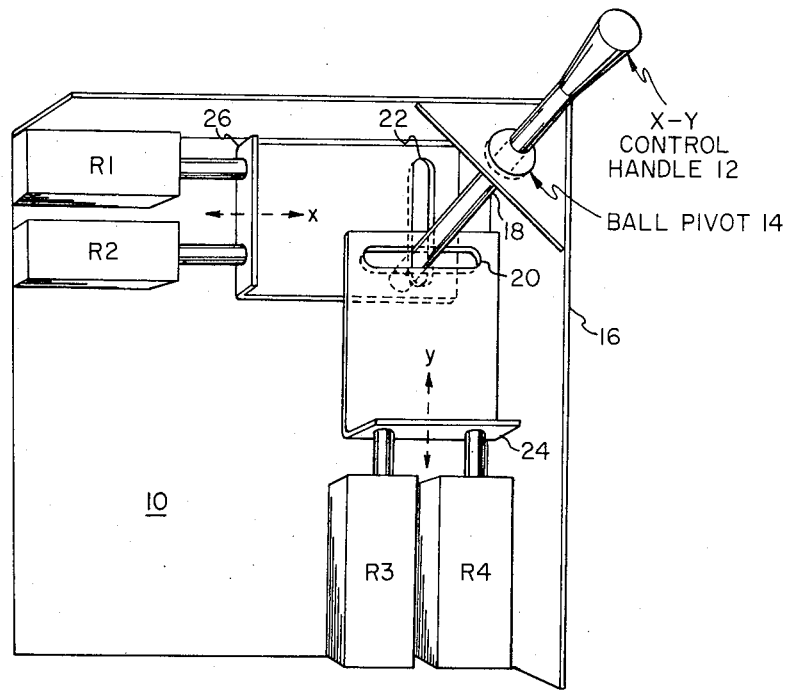
FIG. 4 shows mechanical means for controlling the electronic means shown in FIG. 3.

Positioning control 10 may be, for example, arranged a shown in FIG. 4. Here a control handle 12 is mounted in a ball pivot 14 which rotates in frame 16 of 10. Handle 12 has an extension 18 which projects through two slots 20 and 22 of two respective slides 24 and 26. Movement of handle 12 will move slides 24 and/or 26 horizontally and/or vertically in an obvious manner. Slides 24 and 26 are connected by the members shown to move the taps of potentiometers R1, R2, R3, and R4 to thereby vary the voltages applied to the deflection plates of tube 1. This positions the electron beam and image area 2 of tube 1 in conformance with the position of control handle 12.

Applicant's invention is simple, effective, and readily adapted to computer control. It obviates many of the difficulties experienced with the prior art image expedients used in training devices.

What is claimed is:

1. In a television projection system wherein an image on the face of a cathode ray tube is projected onto a display screen, the improvement comprising:

means for moving said image in a selected direction a selected distance on said display screen, said means comprising adjustable means for moving said image in a selected direction a selected distance on the face of said cathode ray tube, said means for moving said image on the face of said cathode ray tube comprising adjustable means for adjusting the electron beam centering voltages of said tube, said adjustable means for adjusting the electron beam centering voltages comprising a plurality of potentiometers, said plurality comprising two vertical potentiometers for adjusting the electron beam vertically and two horizontal potentiometers for adjusting the electron beam horizontally, means connecting each potentiometer of said plurality to a respective one of a like plurality of deflection means in said cathode ray tube, and means for adjusting said potentiometers, said screen being of a spherical configuration, a spherical reflector located inside said spherical screen, said cathode ray tube being positioned so that said image is reflected from the face of said tube to said spherical screen by said spherical reflector, said means for adjusting said potentiometer comprising a frame, a ball pivot in said frame, a control handle positioned in said ball pivot, a vertical slide positioned in said frame, a horizontal slide positioned in said frame, a horizontal slot in said vertical slide, a vertical slot in said horizontal slide, one end of said control handle projecting through said slots so that vertical movement of said handle causes vertical movement of said vertical slide and horizontal movement of said handle causes horizontal movement of said horizontal slide, means connecting said vertical slide to respective taps of said vertical potentiometers and means connecting said horizontal slide to respective taps of said horizontal potentiometers so that movement of said control handle adjusts said potentiometers to move said image on the face of said tube in a direction commensurate with and a distance proportional to the movement of said control handle to move the image on said screen in a similar manner.

* * * * *